(No Model.)
J. F. SUMNER.
SPECTACLES.
No. 484,725.  Patented Oct. 18, 1892.
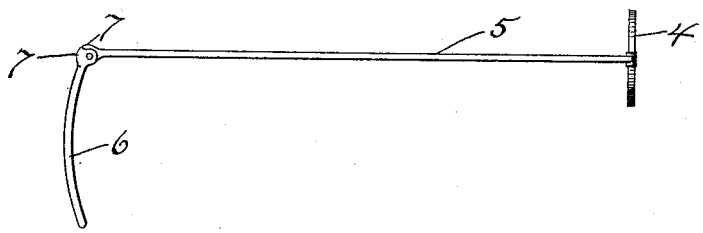
Fig. 1.
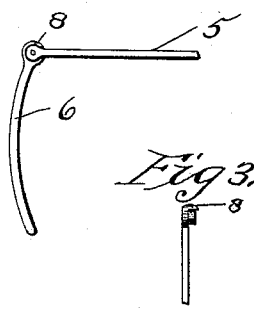
Fig. 2.
Fig. 3.
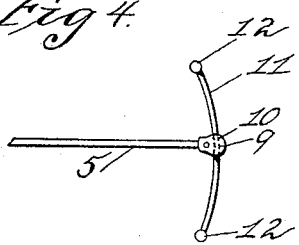
Fig. 4.
Attest
Wm. T. Hall.
F. L. Middleton.
Inventor
J. Frederick Sumner
by Ellis Spear
Atty

UNITED STATES PATENT OFFICE.

JOHN FREDERICK SUMNER, OF MARBLEHEAD, MASSACHUSETTS.

SPECTACLES.

SPECIFICATION forming part of Letters Patent No. 484,725, dated October 18, 1892.

Application filed June 23, 1892. Serial No. 437,701. (No model.)

*To all whom it may concern:*

Be it known that I, JOHN FREDERICK SUMNER, a citizen of the United States of America, residing at Marblehead, in the county of Essex and State of Massachusetts, have invented certain new and useful Improvements in Spectacles, of which the following is a specification.

My invention is an improvement in spectacles; and the object of the invention is to improve the riding-bows which pass around over the ear and hold the spectacles in place. In the form of bow heretofore most commonly used the wires which are adapted to pass behind the ear are formed in one piece each; but owing to the size and shape it is necessary to bend or compress the bows in placing them within the spectacle-case, and this tends to cause them to become twisted and to prevent the glasses from fitting the wearer properly.

My invention consists in forming the bows or temples in two parts, one straight or approximately so, passing from the frame of the spectacles backward to a point over the ear and the other part curved and pivoted to the straight portion and adapted to be held at approximately right angles to the straight portion while the spectacles are in position upon the wearer, but when not in use to fold down upon the straight portion to permit the spectacles to be readily inserted in the case.

The invention further consists in the particular form of bows or temples hereinafter described and claimed, and illustrated in the accompanying drawings, in which—

Figure 1 represents an end view of a pair of spectacles embodying my invention. Figs. 2, 3, and 4 show modified forms of the idea.

In the drawings, 4 represents the frame of a pair of spectacles, and 5 that portion of the bow or temple which is pivoted in the frame of the spectacles at the end thereof and adapted to pass rearwardly over the ear in substantially the usual manner. To the rear end of the part 5 is pivoted the curved section 6. The pivot or hinge in which this piece 6 is carried is so formed that when not in use the shorter section will fold down upon the part upon which it is pivoted, and as this part folds down upon the frame of the spectacles the whole will occupy a very small space and may be easily inserted in the spectacle-case without bending any of the parts. When in use, the short section occupies the position shown in the drawings at approximately right angles to the piece upon which it is pivoted, passing down behind the ear, and thus holding the spectacles firmly in position. The best form of hinge for joining the two parts is that shown in Fig. 1, in which each part is enlarged at the end and has its face cut away on one side, allowing the faces of the parts at the cut-away portion to fit snugly together, and a pivot-pin is passed through to hold the parts together. Each part is provided with a shoulder 7, overlapping the other, and when the pivoted portion is swung out at right angles to the main part these shoulders come in contact with each other and prevent further outward movement.

Instead of having two shoulders, one on each part, the material of one of the pieces may be upset or headed over at the end, bending over the other part, as shown in Figs. 2 and 3. This bent-over part will allow free pivotal movement until the parts are at right angles to each other, when this bent-over part or lug 8 will come in contact with the shank of the part upon which it is pivoted and further movement is prevented.

In Fig. 4 I have shown still another modification, in which the hinge may be of any desired form, but the curved piece is of different construction. In this form a piece 9, of suitable size and shape, is pivoted to the arm 5 in the manner above described. This piece 9 has a recess or passage-way 10, through which is inserted the curved ear-bow 11 in such manner as to permit of its being slid longitudinally therein, it being retained therein by enlargements upon its ends, as at 12.

What I claim is—

1. A pair of spectacles having the temples thereof composed of a straight portion and the curved or ear portion with a folding connection between said parts, said ear portion being held at right angles to the straight portion when in use, substantially as described.

2. A pair of spectacles having the temples consisting of the straight portion 5, a piece 9, hinged thereto and provided with an opening or passage-way therein, and a curved portion 11, carried in said opening, substantially as described.

In testimony whereof I affix my signature in presence of two witnesses.

J. FREDERICK SUMNER.

Witnesses:
 RODNEY LUND,
 C. H. WELCH.